US010191947B2

(12) United States Patent
Das et al.

(10) Patent No.: US 10,191,947 B2
(45) Date of Patent: Jan. 29, 2019

(54) PARTITIONING ADVISOR FOR ONLINE TRANSACTION PROCESSING WORKLOADS

(71) Applicant: Microsoft Technology Licensing, LLC, Redmond, WA (US)

(72) Inventors: Sudipto Das, Redmond, WA (US); Jayanta Mondal, Hyattsville, MD (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 432 days.

(21) Appl. No.: 14/857,284

(22) Filed: Sep. 17, 2015

(65) Prior Publication Data

US 2017/0083566 A1 Mar. 23, 2017

(51) Int. Cl.
G06F 17/30 (2006.01)
G06F 7/00 (2006.01)

(52) U.S. Cl.
CPC .. G06F 17/30486 (2013.01); G06F 17/30563 (2013.01); G06F 17/30592 (2013.01)

(58) Field of Classification Search
CPC ......... G06F 17/30486; G06F 17/30592; G06F 17/30563
USPC ...................................................... 707/607
See application file for complete search history.

(56) References Cited

U.S. PATENT DOCUMENTS

| 882,087 | A | 3/1908 | Wilson |
|---|---|---|---|
| 7,249,141 | B2 | 7/2007 | Agrawal et al. |
| 7,580,941 | B2 | 8/2009 | Narasayya et al. |
| 7,890,458 | B2 | 2/2011 | Dias et al. |
| 8,001,109 | B2 | 8/2011 | Lohman et al. |
| 8,458,167 | B2 | 6/2013 | Lohman et al. |
| 8,700,876 | B2 | 4/2014 | Shah et al. |
| 8,768,916 | B1 | 7/2014 | Ghazal |
| 8,903,807 | B2 | 12/2014 | Thiyagarajan et al. |
| 2008/0215580 | A1* | 9/2008 | Altinel ................ G06F 17/3048 |
| 2010/0114976 | A1 | 5/2010 | Castellanos et al. |
| 2012/0109936 | A1 | 5/2012 | Zhang et al. |
| 2013/0073537 | A1* | 3/2013 | Simon ............... G06F 17/30463 707/714 |
| 2014/0012881 | A1 | 1/2014 | Roesch et al. |
| 2014/0279892 | A1 | 9/2014 | Bourbonnais et al. |

(Continued)

OTHER PUBLICATIONS

Agrawal et al., "Automated Selection of Materialized Views and Indexes for SQL Databases," published Sep. 10, 2000, In Proceedings of the 26th International Conference on Very Large Databases, 10 pages.

(Continued)

*Primary Examiner* — Kuen S Lu
(74) *Attorney, Agent, or Firm* — Schwegman Lundberg & Woessner, P.A.

(57) ABSTRACT

A partitioning advisor for online transaction processing (OLTP) workloads generates a workload dependency graph based on a schema defining a structure of a relational database and a workload associated with an OLTP application that accesses the relational database. Based on the workload dependency graph, the partitioning advisor generates one or more partitioning strategy recommendations for sharding the relational database. The partitioning advisor may also render a visualization based on the workload dependency graph, enabling a user to see the impact each recommended partitioning strategy is predicted to have.

16 Claims, 13 Drawing Sheets

(56) References Cited

U.S. PATENT DOCUMENTS

2015/0172412 A1* 6/2015 Escriva ............ G06F 17/30091
709/202
2016/0094657 A1* 3/2016 Vieira ................. H04L 67/1097
709/217

OTHER PUBLICATIONS

Agrawal et al., "Database Tuning Advisor for Microsoft SQL Server 2005," published Aug. 2004, In Proceedings of the 30th VLDB Conference, 12 pages.
Agrawal et al., "Integrating Vertical and Horizontal Partitioning into Automated Physical Database Design," published Jun. 13, 2004, In Proceedings of the ACM SIGMOD international conference on Management of data, 12 pages.
Alagiannis et al., "An Automated, Yet Interactive and Portable DB Designer," published Jun. 6, 2010, In Proceedings of the ACM SIGMOD International Conference on Management of data, 4 pages.
Chaudhuri et al., "AutoAdmin 'What-if' Index Analysis Utility," published Jun. 1998, In Proceedings of ACM SIGMOD international conference on Management of data, 12 pages.
Chen et al., "Fast foreign-key detection in Microsoft SQL server PowerPivot for Excel," published Aug. 2014, In Proceedings of the VLDB Endowment vol. 7, Issue 13, 12 pages.
Curino et al, "Schism: a Workload-Driven Approach to Database Replication and Partitioning," published Sep. 2010, In Proceedings of the VLDB Endowment, vol. 3, Issue 1-2, 10 pages.
"Graphviz—Graph Visualization Software," retrieved on May 29, 2015, at <<http://www.graphviz.org/>> 5 pages.
Hotea Solutions, "TPC-C V5," retrieved Jun. 4, 2015 at <<http://www.tpc.org/tpcc/>> 2 pages.
Hotea Solutions, "TPC-E," retrieved on Jun. 4, 2015 from <<http://www.tpc.org/tpce>> 2 pages.
Jindal et al., "Relax and Let the Database do the Partitioning Online," published Sep. 2, 2011, In Proceedings of 37th International Conference on Very Large Databases, 27 pages.
TechNet, Microsoft, "Index Tuning Wizard," published Oct. 17, 2013, 2 pages.
Nehme et al, "Automated Partitioning Design in Parallel Database Systems," published Jun. 12, 2011, In Proceedings of ACM SIGMOD International Conference on Management of data, 12 pages.
Pavlo et al., "Skew-Aware Automatic Database Partitioning in Shared-Nothing, Parallel OLTP Systems," published May 20, 2012, In Proceedings of ACM SIGMOD International Conference on Management of Data, 12 pages.
Quamar et al., "SWORD: Scalable Workload-Aware Data Placement for Transactional Workloads," published Mar. 18, 2013, In Proceedings of the 16th International Conference on Extending Database Technology, 12 pages.
Rao et al., "Automating Physical Database Design in a Parallel Database," published Jun. 3, 2002, In Proceedings of the ACM SIGMOD international conference on Management of data, 12 pages.
Schnaitter et al., "Semi-Automatic Index Tuning: Keeping DBAs in the Loop," published Aug. 27, 2012, In Proceedings of the VLDB Endowment, vol. 5, Issue 5, 12 pages.
Tran et al., "JECB: A Join-Extension, Code-Based Approach to OLTP Data Partitioning," published Jun. 22, 2014, In Proceedings of the ACM SIGMOD international conference on Management of data, 12 pages.
Zilio et al, "DB2 Design Advisor: Integrated Automatic Physical Database Design," published Aug. 31, 2004, In Proceedings of the 30th VLDB Conference, vol. 30, 11 pages.
Zilio et al., "Recommending Materialized Views and Indexes with the IBM DB2 Design Advisor," published May 17, 2004, In Proceedings. International Conference on Autonomic Computing, 9 pages.

* cited by examiner

PARTITIONING ADVISOR FOR ONLINE TRANSACTION PROCESSING WORKLOADS

BACKGROUND

With ever-increasing data size and transactions rates for online transaction processing (OLTP) applications, horizontally partitioning, or sharding, the database is a common technique to scale out the database to multiple servers in a shared-nothing architecture. To leverage the benefits of scale-out, effective partitioning techniques typically limit most transactions to a single server. However the design of effective partitioning techniques is challenging given the applications' complexity with hundreds of tables and transaction types. Existing techniques typically recommend a partitioning strategy that minimizes a percentage of distributed transactions in a workload, assuming that each transaction has a similar cost.

SUMMARY

This disclosure describes systems and methods for generating partitioning strategy recommendations for partitioning, or sharding, a relational database. One or more partitions may be co-located on a single server, and/or partitions may be distributed across multiple servers. In at least one example, a partitioning advisor analyzes a schema that defines a structure of a relational database and a workload associated with an OLTP application. Based on the schema and the workload, the partitioning advisor generates a workload dependency graph. A visualization of the workload dependency graph may be rendered, giving a database administrator a visual indicator of how sharding the database based on a particular attribute may affect the overall workload. Furthermore, the partitioning advisor may utilize a query optimizer associated with the relational database to calculate an estimated workload cost for a particular partitioning strategy. The partitioning advisor recommends one or more partitioning strategies based, for example, on a lowest estimated workload cost.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to one or more systems, methods, computer-readable instructions, modules, algorithms, hardware logic, and/or operations as permitted by the context described above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Figure 1:
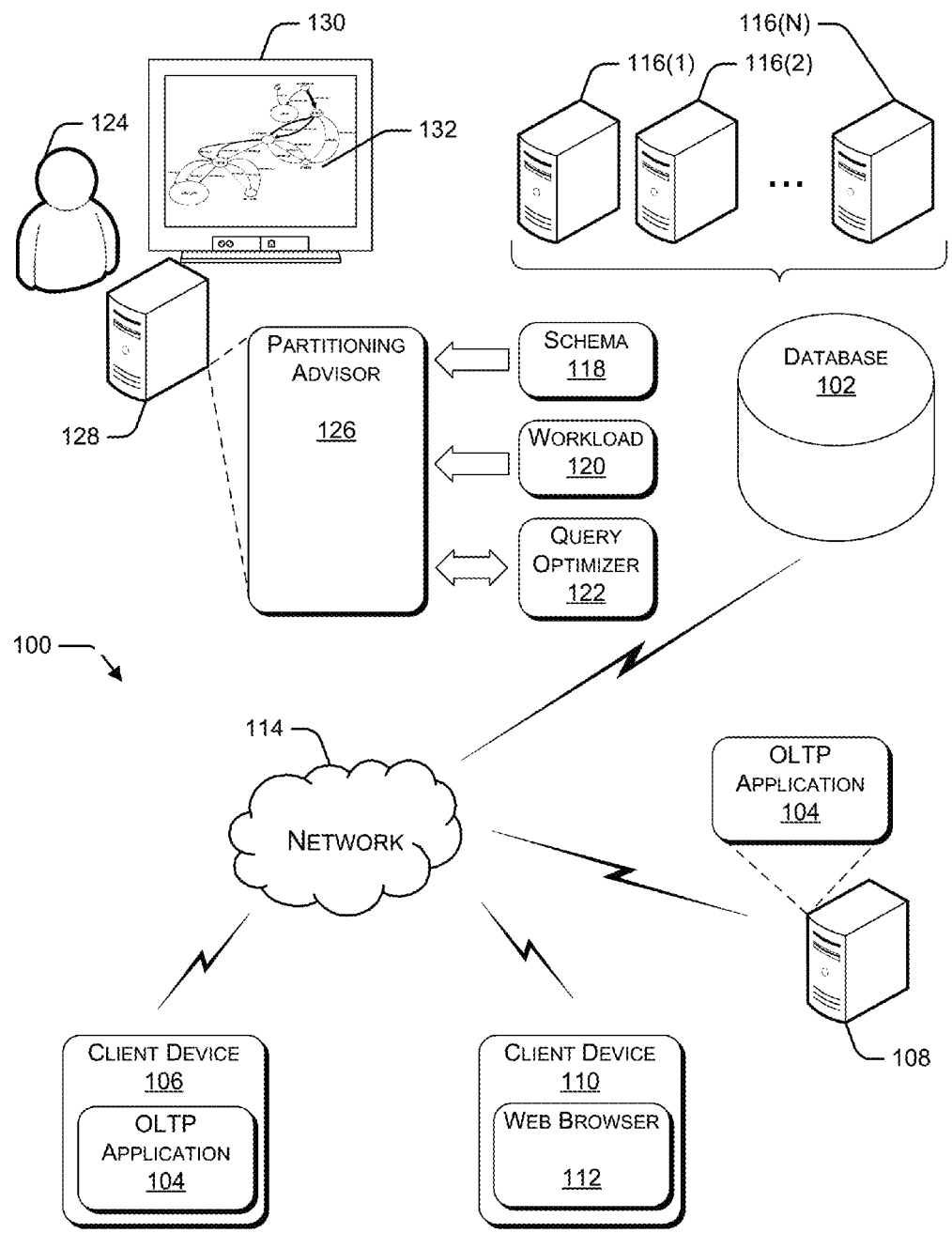
FIG. 1 is a pictorial diagram illustrating an example environment for implementing a partitioning advisor, as described herein.

Relational databases can be used to support a variety of applications, such as, for example, online transaction process (OLTP) applications and data warehousing applications. OLTP applications differ from data warehousing applications in that with a data warehousing application, the number of rows accessed by a particular query is typically proportional to the size of the database. In contrast, OLTP applications typically include transactions that return a fewer number of rows, with the number of rows not based on the size of the database. Also, OLTP applications typically run a large number of concurrent, short-running, read/write transactions, while data warehousing applications typically run fewer, long-running, read-mostly queries. Accordingly, the goal for sharding a relational database that supports an OLTP application is different than the goal for sharding a relational database that supports a data warehousing application. That is, for a data warehousing application, the database is typically partitioned to leverage intra-query parallelism so that a query can execute on multiple partitions in parallel. In contrast, for an OLTP application, the database is typically partitioned such that most transactions access a single partition so that the OLTP application can spread the load across multiple partitions, leveraging inter-transaction parallelism to improve performance.

As discussed above, OLTP transactions are typically short-running and typically access only a small number of tables. Accordingly, a partitioning strategy that does not distribute single transactions across multiple partitions is desired. That is, if the database is partitioned such that a transaction requires access to multiple partitions, the cost of the transaction is increased due to the overheads associated with distributed transaction management. A workload, as defined herein, is a set of transactions associated with an OLTP application. Accordingly, the partitioning advisor for OLTP workloads described herein uses an estimated total workload cost as an optimization goal. The cost of a transaction, and additively the cost of the workload, can be estimated based on any number of factors, which may include, for example, and without limitation, the cost to execute the transaction as estimated by the query optimizer, a user-perceived duration to execute the transaction, or the resources needed to execute the transaction.

As an example, consider two transactions that occur with similar frequency within a particular workload. If one of the transactions has a higher cost than the other, then partitioning the database such that the lower cost transaction is distributed will have a lower impact on total workload cost than partitioning the database such that the higher cost transaction is distributed, even though either option would result in a similar number of distributed transactions. In an example implementation, the cost of a transaction in a partitioned database depends on the execution plan selected by the query optimizer. Accordingly, in some examples, the cost model used by the partitioning advisor for OLTP workloads described herein is tightly integrated with the query optimizer of the database being analyzed.

In addition to recommending a partitioning strategy that minimizes the total workload cost, the partitioning advisor for OLTP workloads described herein presents an intuitive visualization of the schema and workload to facilitate interactions with system users, such as database administrators, database developers, application developers, and so on, by providing insights about how partitioning impacts the cost of different transactions and which transactions are most affected by a potential partitioning strategy. With this visualization, a database administrator may make a more informed choice regarding recommended partitioning strategies and/or may choose to modify the workload to make it more amenable to partitioning.

Illustrative Environment

FIG. 1 shows an example environment 100 in which a partitioning advisor for online transaction processing (OLTP) workloads can be implemented. Example environment 100 includes a database 102, which supports an OLTP application 104. Examples of OLTP applications can include, but are not limited to, retail sales applications and customer relationship management applications. As illustrated in FIG. 1, OLTP application 104 may be implemented as a local application on a client device 106, or may be implemented as a remote application, for example, on a web server 108. In the scenario in which the OLTP application is implemented as a remote application, a client device 110 may access the OLTP application, for example, through a web browser 112. In the illustrated example, client device 106, client device 110, web server 108, and database 102 communicate with each other over a network 114.

Network 114 can include, for example, public networks such as the Internet, private networks such as an institutional and/or personal intranet, or some combination of private and public networks. Network 114 can also include any type of wired and/or wireless network, including but not limited to local area networks (LANs), wide area networks (WANs), satellite networks, cable networks, Wi-Fi networks, WiMax networks, mobile communications networks (e.g., 3G, 4G, and so forth) or any combination thereof. Network 114 can utilize communications protocols, including packet-based and/or datagram-based protocols such as internet protocol (IP), transmission control protocol (TCP), user datagram protocol (UDP), or other types of protocols. Moreover, network 114 can also include a number of devices that facilitate network communications and/or form a hardware basis for the networks, such as switches, routers, gateways, access points, firewalls, base stations, repeaters, backbone devices, and the like.

In some examples, network 114 can further include devices that enable connection to a wireless network, such as a wireless access point (WAP). Examples support connectivity through WAPs that send and receive data over various electromagnetic frequencies (e.g., radio frequencies), including WAPs that support Institute of Electrical and Electronics Engineers (IEEE) 802.11 standards (e.g., 802.11g, 802.11n, and so forth), and other standards.

Database 102 may be implemented on one or more database servers such as, for example, database servers 116(1), 116(2), ..., 116(N). As an example, database 102 may be sharded across multiple database servers 116. Database 102 has an associated schema 118, an associated workload 120, and an associated query optimizer 122.

Schema 118 defines the structure of database 102. Schema 118 may include, for example, and without limitation, table definitions, primary key designations, foreign key relationships, view definitions, stored procedures, and so on.

Workload 120 represents transactions against the database 102 initiated by the OLTP application 104.

Query optimizer 122 receives a query, and generates an execution plan for the query. Typically, the query optimizer 122 utilizes a cost model to generate a lowest cost execution plan, where the cost model considers, for example, and without limitation, system resources such as input/output, CPU usage, and memory usage.

Within environment 100, a user 124 (e.g., a database administrator) accesses partitioning advisor 126 via, for example, a computing device 128, which includes a display 130. Partitioning advisor 126 analyzes the schema 118 associated with database 102 along with the workload 120 associated with the database 102 and the OLTP application 104. Based, at least in part, on the schema and the workload, the partitioning advisor 126 generates a workload dependency graph (WDG) in which each node represents a table, and each edge represents dependency between two tables on a particular column. Based on the WDG, the partitioning advisor 126 generates a WDG visualization 132 for presentation on the display 130.

The partitioning advisor 126 also determines multiple partitioning strategies, based on the WDG, and calculates, for each partitioning strategy, an estimated total workload cost. The estimated total workload cost is determined based on cost data for each transaction type, as provided by the query optimizer 122. The partitioning advisor 126 may then recommend one or more of the multiple partitioning strategies.

Figure 2:
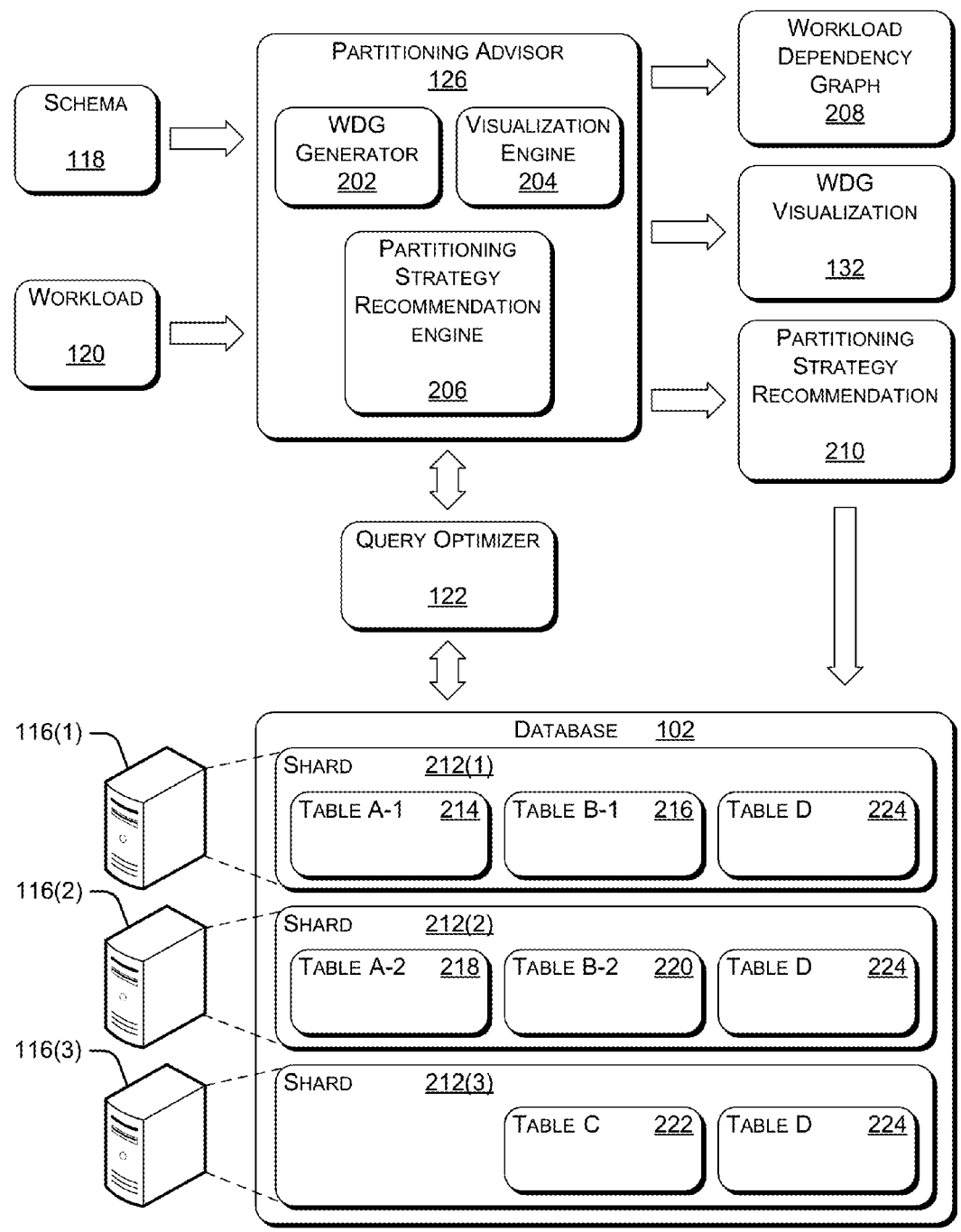
FIG. 2 is a block diagram illustrating data flow associated with an example partitioning advisor, as described herein.

FIG. 2 illustrates example components of the partitioning advisor 126. In the illustrated example, partitioning advisor 126 includes a WDG generator 202, a visualization engine 204, and a partitioning strategy recommendation engine 206. WDG generator 202 analyzes the schema 118 and the workload 120 to generate a workload dependency graph 208.

In an example, schema 118 may be stored in a data dictionary associated with the database 102. In another example, schema 118 may be generated based on database 102 using, for example, a script generation tool. Schema 118 represents the structure of database 102. For example, schema 118 may indicate that database 102 includes four tables, namely, Table A, Table B, Table C, and Table D. Schema 118 may also indicate, for example, and without limitation, fields, primary key/foreign key relationships between the tables, views, indexes, stored procedures, functions, and so on.

Workload 120 is a collection of transactions associated with OLTP application 104. Each transaction includes, for example, one or more Structured Query Language (SQL) statements. A single transaction may include queries against multiple tables. As an example, a stored procedure may include one or more transactions. As another example, a single transaction may include calls to one or more stored procedures. Any number of techniques may be used to generate workload 120. For example, OLTP application 104 or an application developer may provide a representative workload. As another example, a database tool, such as the SQL SERVER Profiler may be used to generate a trace, which is a log of database operations over a period of time. This log may be used as a workload. Other sources that may provide a workload include, without limitation, a plan cache, a query store, and the ORACLE database replay and workload capture. When a query is submitted to database 102, query optimizer 122 generates a query plan, which is saved to the plan cache. The plan cache typically includes data for a relatively short time frame, so, in some instances, may not provide a complete workload. The query store typically maintains a larger set of data, for example, as the data is emptied from the plan cache. In an example implementation, data may be extracted from the query store based on a selectable time frame. One drawback of the query store is that the data typically does not include any temporal data, so the order in which transactions were processed may not be recorded. The ORACLE database replay and workload capture tool maintains, for each session, a sequence of queries that are executed. These or any other workload generation tools may be used to provide workload 120.

WDG generator 202 analyzes the table definitions and the various relationships represented in both the schema 118 and the workload 120 to generate the workload dependency graph 208.

Visualization engine 204 generates a WDG visualization 132 based on the generated WDG 208. The WDG visualization 132 visually indicates various relationships between tables within the database 102, and visually indicates the relative impact sharding may have on each of those relationships.

Partitioning strategy recommendation engine 206 generates one or more partitioning strategy recommendations 210.

FIG. 2 illustrates an example result of applying a partitioning recommendation to database 102. In the illustrated example, database 102 is partitioned across three shards, shard 212(1), shard 212(2), and shard 212(3). In the illustrated example, Table A and Table B are partitioned across shard 212(1) and 212(2), such that Table A-1 214 and Table B-1 216 are stored on server 116(1) and Table A-2 218 and Table B-2 220 are stored on server 116(2). Table C 222 is not partitioned, and is stored on server 116(3). Table D 224 is not partitioned, but rather, is replicated across each of the servers. For relatively small tables that are typically the recipients of read-only queries (e.g., lookup tables), replication across the multiple servers can provide increased overall performance.

Figure 3:
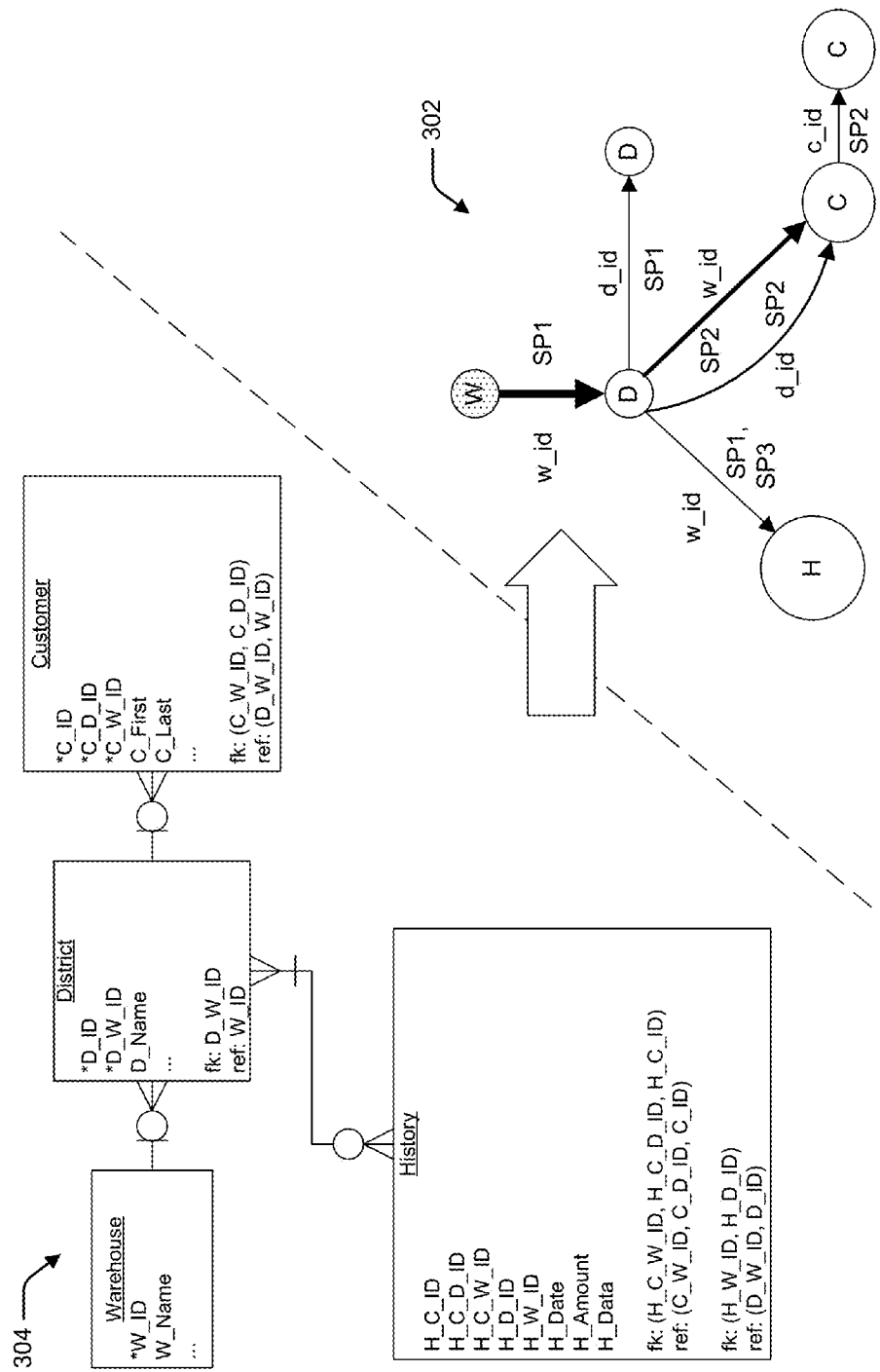
FIG. 3 is a pictorial diagram illustrating a portion of an example relational database schema and an example corresponding workload dependency graph.

FIG. 3 illustrates an example workload dependency graph 302, corresponding to an example schema 304. Example schema 304 illustrates four tables, each having multiple fields. The fields marked with an asterisk represent a primary key for the table. "fk" denotes a foreign key and "ref" denotes the fields referenced by the foreign key.

Example WDG 302 illustrates relationships between the tables based on the foreign key relationships. WDG 302 also illustrates relationships between tables based on stored procedures (not shown in example schema 304), such as SP1 and SP2. In the illustrated example, each circle corresponds to a table in the schema, with the relative sizes of the circles indicating relative write ratios. The shaded "W" circle, corresponding to the "Warehouse" table indicates that the table is a read only table. The thickness of the lines between the nodes represents an execution frequency, that is, the thicker the line between two tables, the more likely a transaction will impact the tables. In other words, the thicker a line between two tables, the greater the benefit of choosing that edge as a partitioning attribute.

Figure 4:
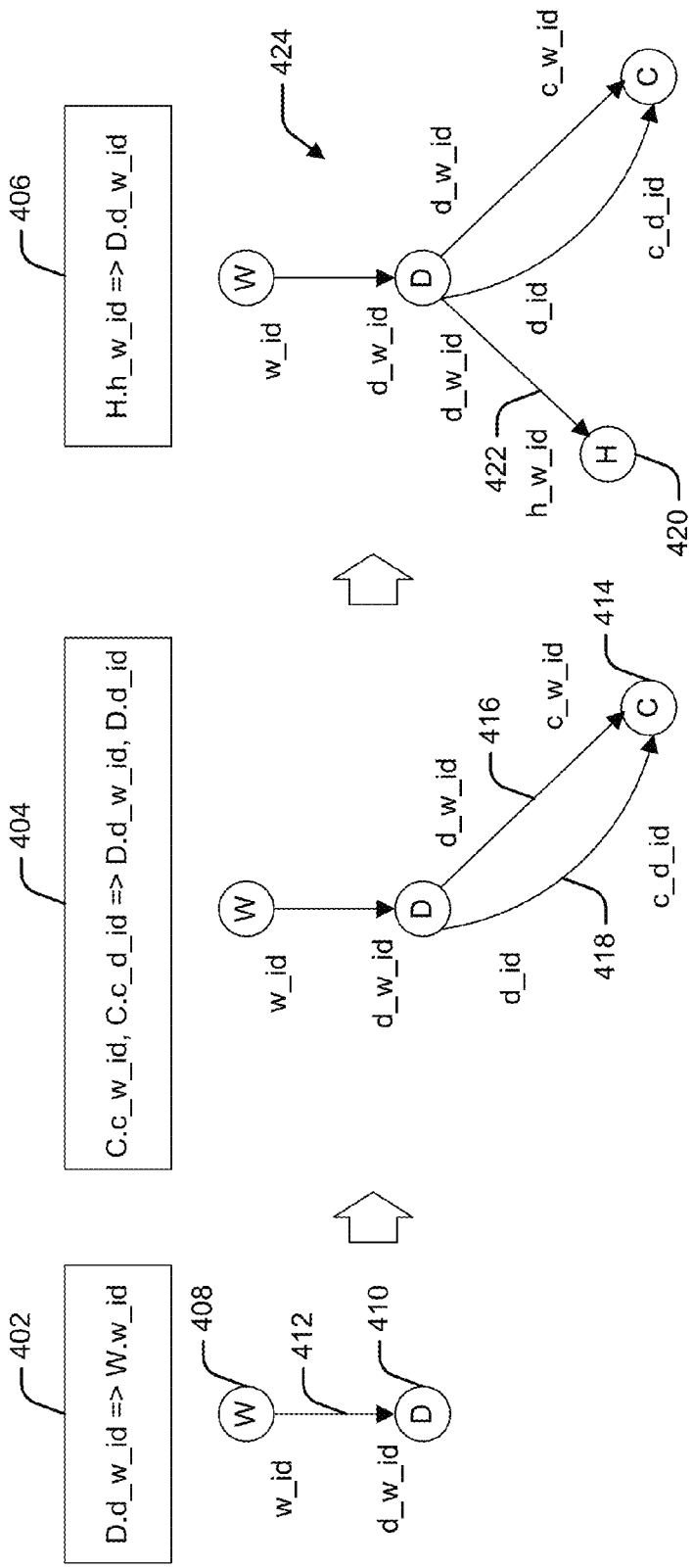
FIG. 4 is a pictorial diagram illustrating an example process for indicating foreign key relationships in a workload dependency graph.
Figure 5:
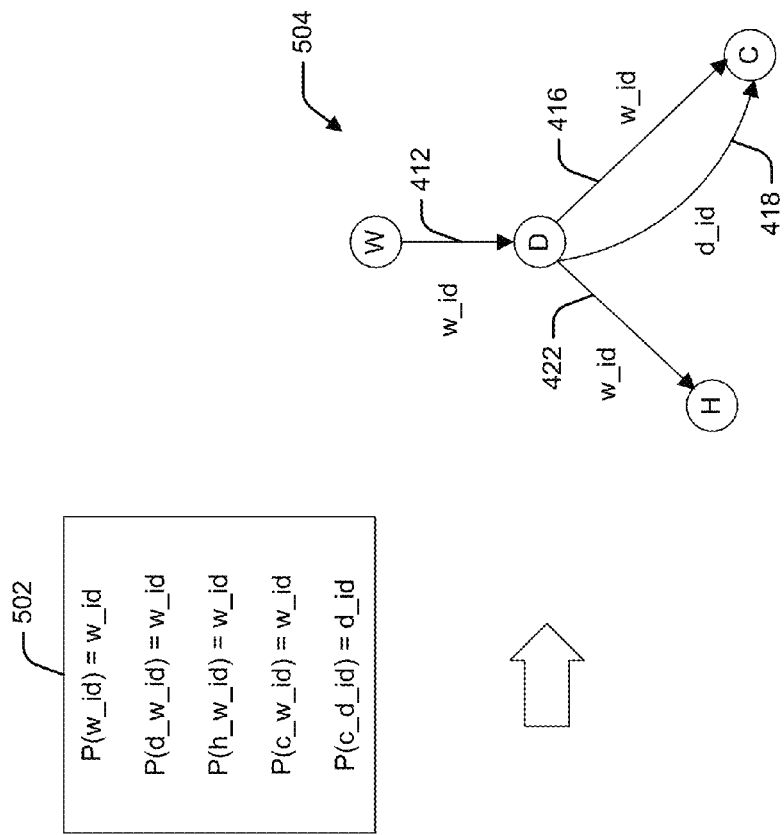
FIG. 5 is a pictorial diagram illustrating an example process for simplifying a representation of foreign key relationships in a workload dependency graph.
Figure 5:
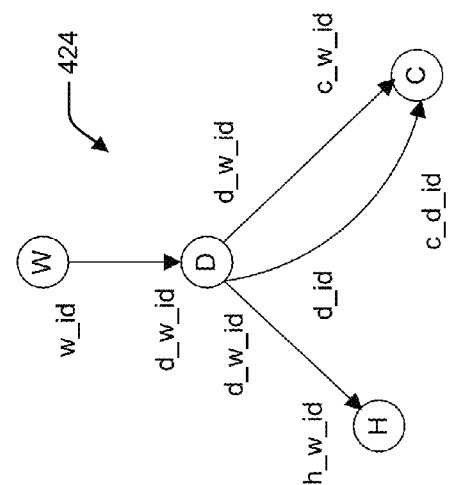
Figure 6:
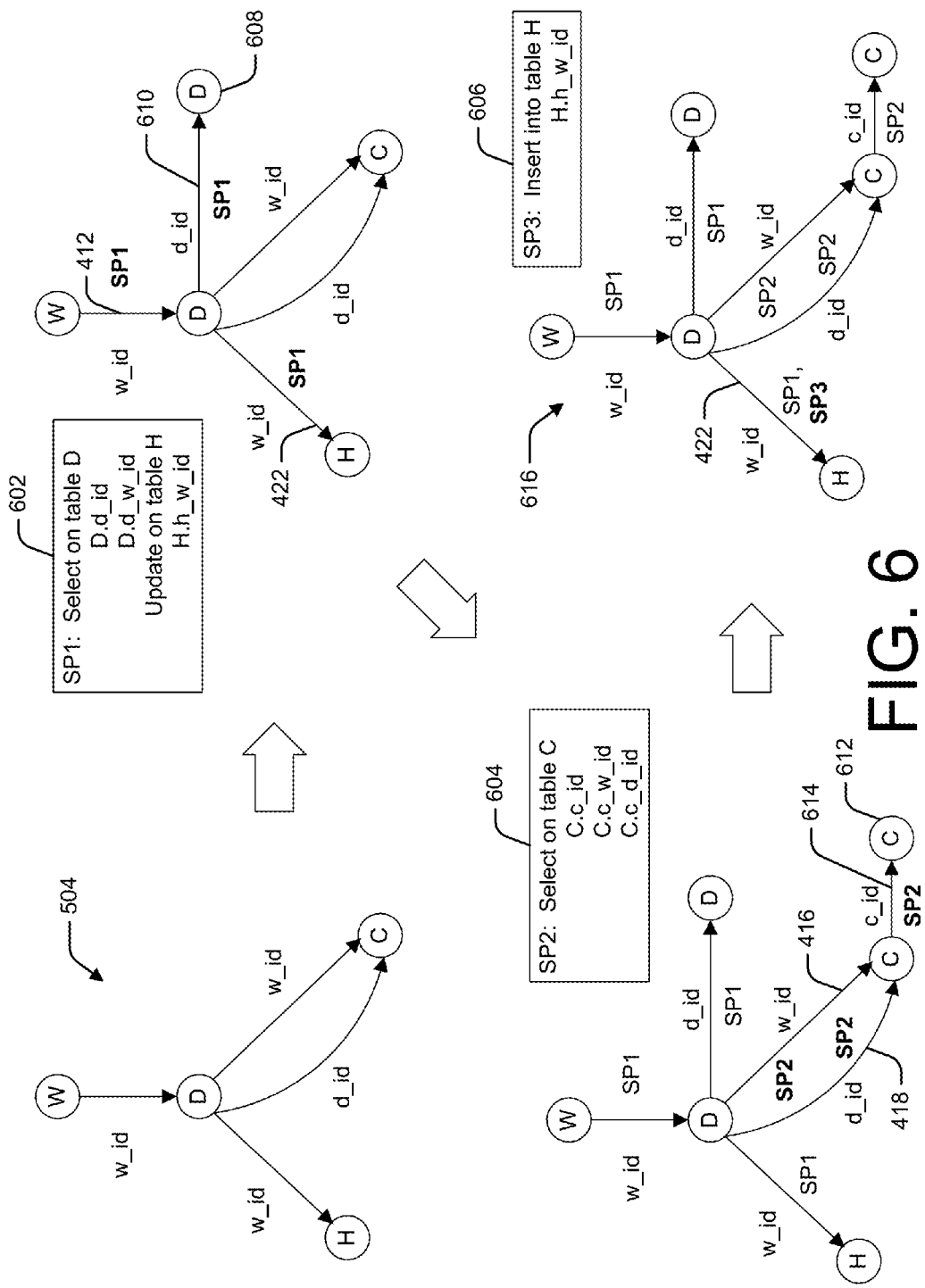
FIG. 6 is a pictorial diagram illustrating an example process for representing stored procedures in a workload dependency graph.

FIGS. 4-6 illustrate creation of an example workload dependency graph.

FIG. 4 illustrates an example process for analyzing foreign keys to represent column dependencies in a workload dependency graph. In an example, WDG generator 202 analyzes schema 202 to identify foreign keys 402, 404, and 406. Referring to the schema 304 shown in FIG. 3, foreign key 402 indicates that the d_w_id field in the district table has a foreign key relationship to the w_id field in the warehouse table. Accordingly, node 408, representing the warehouse table, and node 410, representing the district table are added to the WDG, with an edge 412 between them that is labeled with the foreign key relationship.

Foreign key 404 indicates that the c_w_id and c_d_id fields in the customer table have a foreign key relationship to the d_w_id and d_id fields in the district table. Accordingly, node 414, representing the customer table is added to the WDG, with edges 416 and 418 between the district table and customer table that is labeled with the foreign key relationships.

Foreign key 406 indicates that the h_w_id field in the history table has a foreign key relationship to the d_w_id field in the district table. Accordingly, node 420, representing the history table is added to the WDG, with an edge 422 between the history table and district table that is labeled with the foreign key relationship. Resulting intermediate WDG 424 may be further processed as described below with reference to FIG. 5.

FIG. 5 illustrates an example process for simplifying the foreign key relationships in the intermediate workload dependency graph 424 based on parent foreign key relationships. The parent foreign key relationships 502 indicate that each of w_id, d_w_id, h_w_id, and c_w_id is equivalent to w_id. Accordingly, edges 412, 416, and 422 are each labeled with a single field, w_id. Similarly, the parent foreign key relationships 502 indicate that c_d_id is equivalent to d_id. Accordingly, edge 418 is labeled with a single field, d_id. Resulting intermediate WDG 504 may be further processed as described below with reference to FIG. 6.

FIG. 6 illustrates an example process for updating the intermediate workload dependency graph 504 based on workload analysis. In the illustrated example, the workload includes three stored procedures 602, 604, and 606.

Stored procedure SP1 602 includes a "select" statement against table D, which includes a foreign key of the W table, and an "update" statement on table H. Accordingly, edges 412 and 422 are labeled with SP1. Furthermore, a new node 608 and a new edge 610 are added to the workload dependency graph and labeled with SP1 to represent the "select" statement against table D.

Stored procedure SP2 604 includes a "select" statement against table C, which includes two foreign key fields of the D table. Accordingly, edges 416 and 416 are labeled with SP2. Furthermore, a new node 612 and a new edge 614 are added to the workload dependency graph and labeled with SP2 to represent the "select" statement against table C.

Stored procedure SP3 606 includes an "insert" statement on table H. Accordingly, edge 422 is labeled with SP3. Resulting intermediate WDG 616 may be further processed as described below with reference to FIG. 7.

Figure 7:
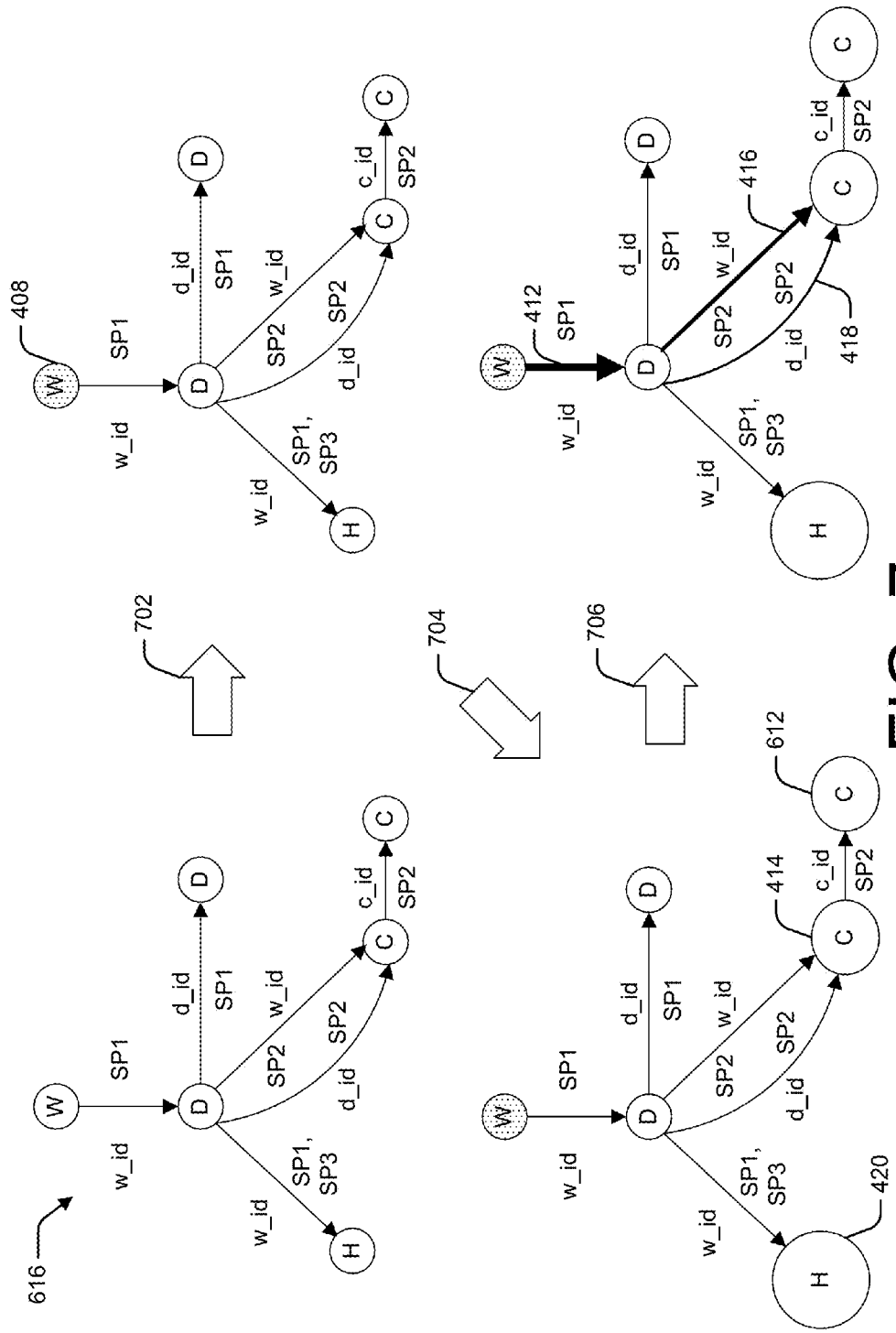
FIG. 7 is a pictorial diagram illustrating an example process for adjusting a workload dependency graph based on dynamic information.

FIG. 7 illustrates an example process for updating the intermediate workload dependency graph based on operational statistics. In a first operation, indicated by arrow 702, any read only tables are denoted in the WDG. In the illustrated example, the node 408 representing the warehouse table is shaded to indicate that the warehouse table is a read only table.

In another operation, indicated by arrow 704, relative write ratios are indicated in the WDG. In the illustrated example, nodes 414 and 612 are increased in size, relative to the node representing the district table, indicating that the customer table has a higher write ratio than the district table. Furthermore, node 420, representing the history table, is increased to an even larger size than nodes 414 and 612, indicating that the history table has a higher write ratio than the customer table.

In another operation, indicated by arrow 706, edges 412, 416, and 418 are increased in thickness to represent relative execution frequency, which, in an example, is recursively accumulated upward. In the described example, thicker edges represent edges that, if chosen as a partitioning attribute, will provide relatively greater benefit in minimizing a cost associated with the partitioning.

Based on the generated workload dependency graph, visualization engine 204 generates a WDG visualization and partitioning strategy recommendation engine 206 recommends one or more partitioning strategies.

Figure 8:
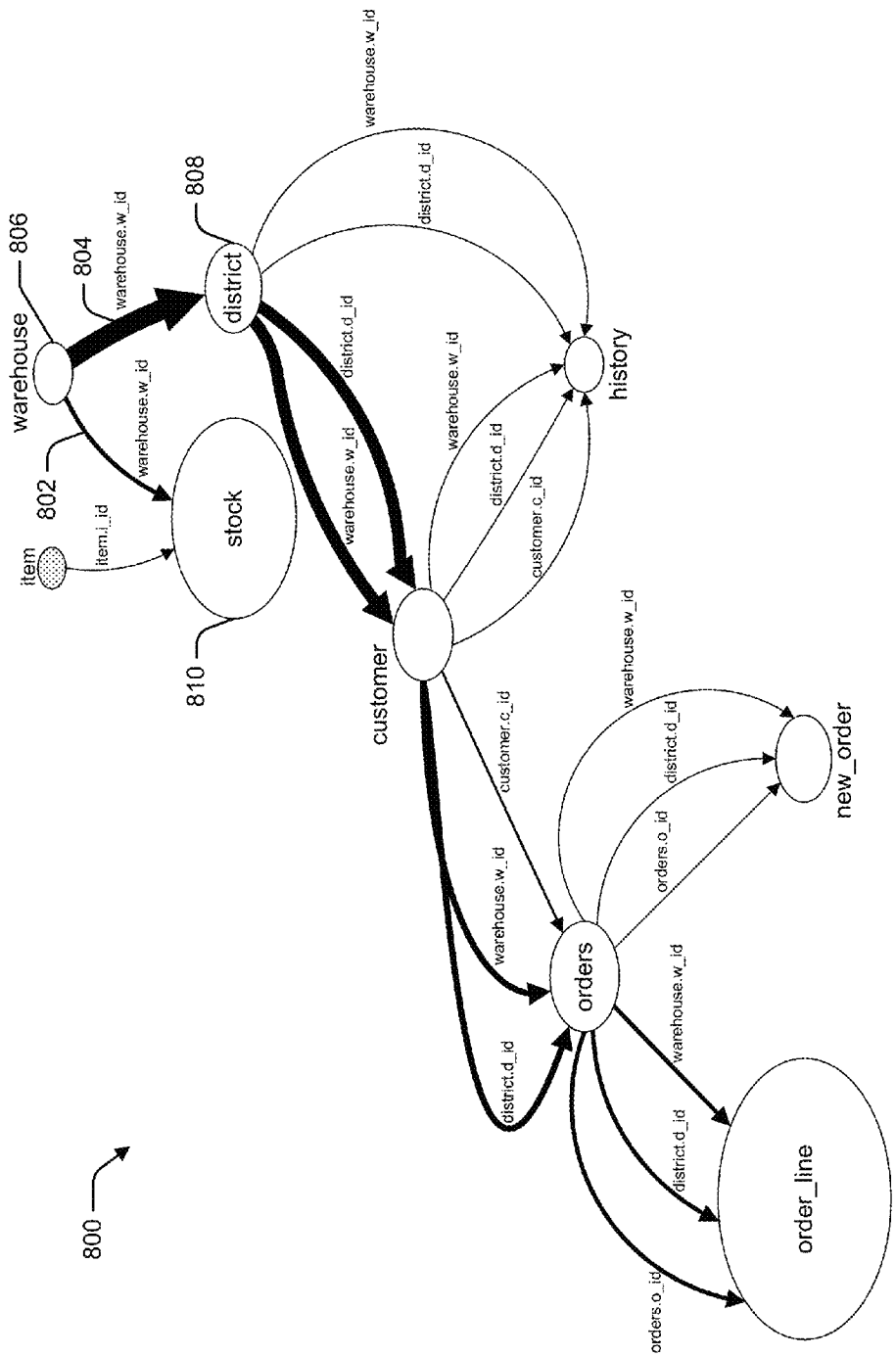
FIG. 8 is a pictorial diagram illustrating a rendered example visualization of a workload dependency graph.

FIG. 8 illustrates an example WDG visualization 800 that may be generated by visualization engine 204. The illustrated example visualization is based on an OLTP workload and a schema that includes nine tables, each represented as a node in the WDG visualization. As with example WDG 302 shown in FIG. 3, a shaded node indicates that the table corresponding to the node is a read only node. Also, the thickness of the directed edges between the nodes represents a relative impact of partitioning based on the edge. For example, the relative thickness of arrows 802 and 804 indicate that greater benefit would be obtained by sharding the warehouse table 806 and the district table 808 based on the warehouse.w_id than by sharding the warehouse table 806 and the stock table 810 based on the warehouse.w_id. In an example implementation, WDG visualization 800 may be presented, for example, via display device 130, enabling a user (e.g. database administrator) to visually analyze the relative impact of the various relationships that correspond to the schema and the OLTP workload.

In addition to the various relationships illustrated in the WDG visualization, there may be other constraints that cannot be directly captured and represented by the partitioning advisor. For example, there may be scenarios in which the lowest-cost partitioning strategy does not comply with one or more application constraints. For example, the application may prefer that a particular transaction type be non-distributed due to latency requirements, even though distributing that particular type of transaction may result in the cheapest workload cost. Using the WDG visualization, a user (e.g., a database administrator) can identify a more preferable, although not lowest cost, partitioning strategy that conforms with the application constraints.

Figure 9:
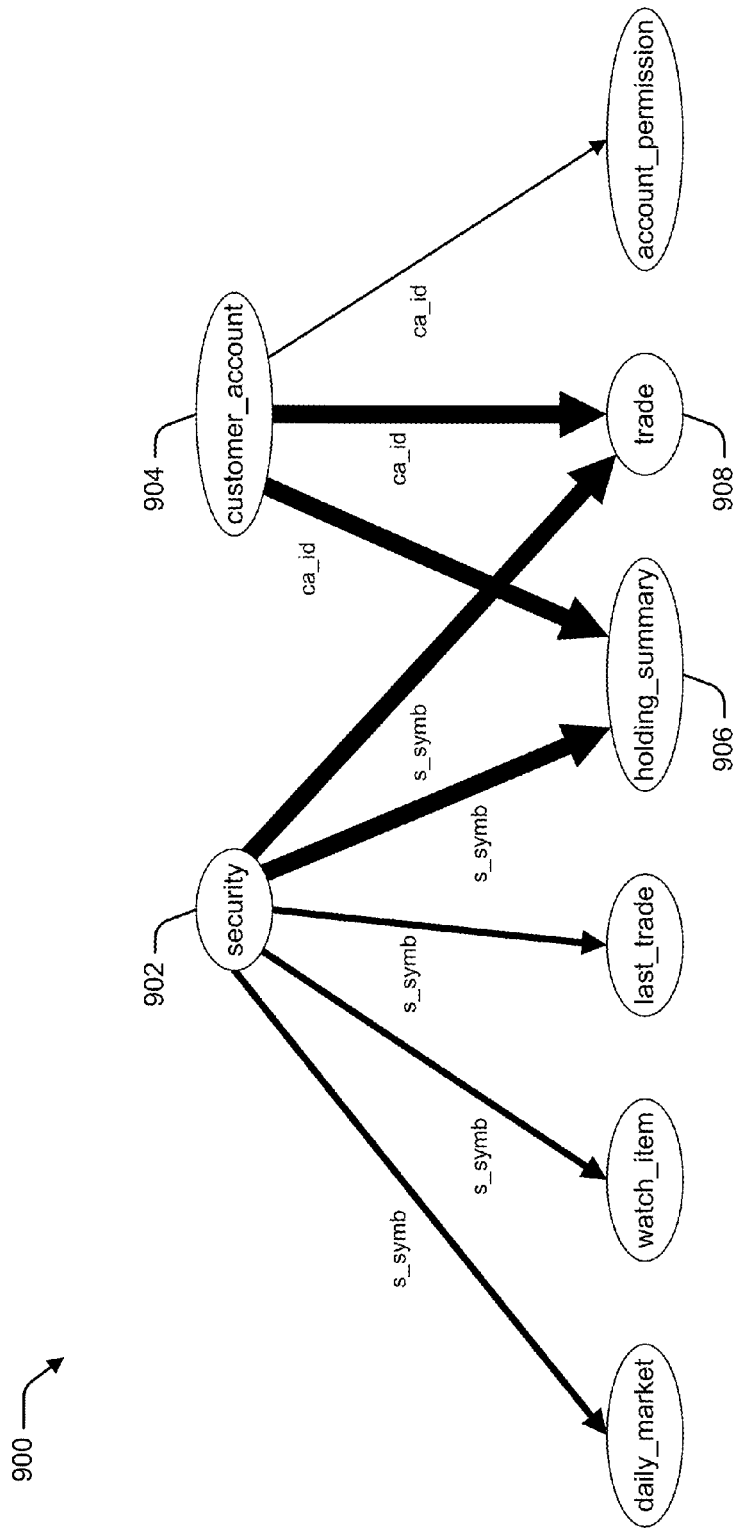
FIG. 9 is a pictorial diagram illustrating at least a portion of a rendered example visualization of a workload dependency graph.

Furthermore, the WDG visualization may help the user identify ways in which the application and/or database may be modified to make the database more amenable to partitioning. For example, FIG. 9 illustrates at least a portion of a WDG visualization 900 for a database with more complicated relationships. As illustrated, the WDG visualization indicates that any partitioning strategy will result in distribution of frequent transactions. That is, both the security table 902 and the customer account table 904 have similar relationships with the holding_summary table 906 and the trade table 908. Accordingly, partitioning based on the ca_id column will cause distributed transactions with regard to the security table, and partitioning based on the s_symb column will cause distributed transactions with regard to the customer_account table. As a result, the user may modify the database structure and/or the transactions of the application, making the database more suitable to partitioning.

Figure 10:
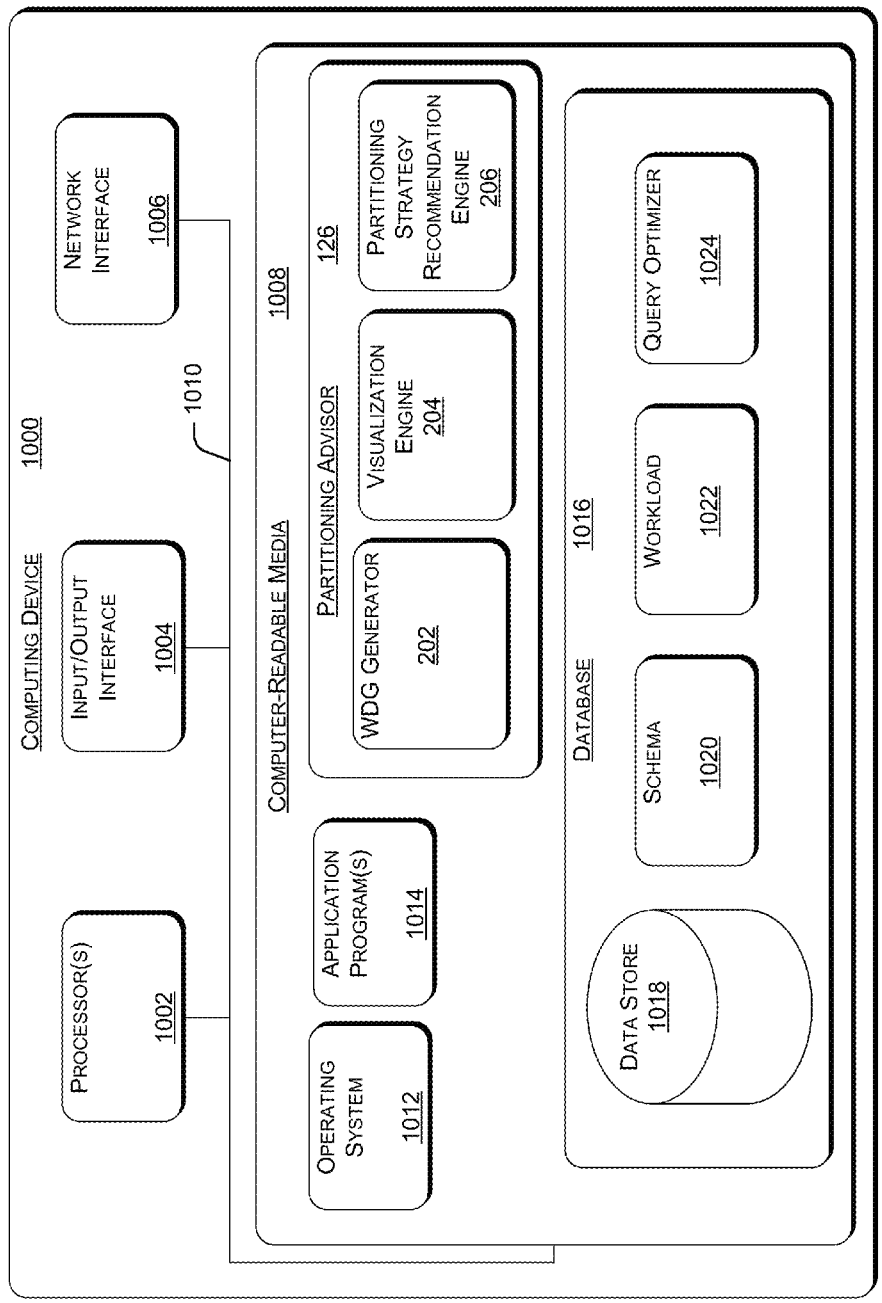
FIG. 10 is a block diagram illustrating select components of an example computing device configured to support a partitioning advisor, as described herein.

FIG. 10 illustrates select components of an example computing device configured to implement the partitioning advisor described herein. Example computing device 1000 includes one or more processors 1002, input/output interface 1004, network interface 1006, and computer-readable media 1008. In an example implementation, processors 1002, input/output interface 1004, network interface 1006, and storage media 1008 are connected and communicate with each other via a bus 1010. Bus 1010 may include, for example, and without limitation, one or more of a system bus, a data bus, an address bus, a PCI bus, a Mini-PCI bus, and any variety of local, peripheral, and/or independent buses.

Processor 1002 is configured to load and execute computer-executable instructions. Processor 1002 can represent, for example, a CPU-type processing unit, a GPU-type processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-chip systems (SOCs), Complex Programmable Logic Devices (CPLDs), etc.

Input/output interface 1004 allows computing device 1000 to communicate with input/output devices such as user input devices including peripheral input devices (e.g., a keyboard, a mouse, a pen, a game controller, a voice input device, a touch input device, a gestural input device, and the like) and/or output devices including peripheral output devices (e.g., a display, a printer, audio speakers, a haptic output, and the like).

Network interface 1006 enables communications between computing device 1000 and other networked devices such as database servers 116. Network interface 1006 can include, for example, one or more network interface controllers (NICs) or other types of transceiver devices to send and receive communications over a network.

Computer-readable media 1008 stores executable instructions that are loadable and executable by processors 1002. The executable instructions can include, for example, an operating system 1012, any number of application programs 1014, and partitioning advisor 126. Alternatively, or in addition, the functionally described herein can be performed, at least in part, by one or more hardware logic components such as accelerators. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

As described above with reference to FIG. 2, partitioning advisor 126 includes WDG generator 202, visualization engine 204, and partitioning strategy recommendation engine 206.

As illustrated in FIG. 10, computer-readable media 1008 may also include database 1016, which includes data store 1018, schema 1020, workload 1022, and query optimizer 1024. Alternatively, one or more components of database 1016 may be implemented on a different computing device. For example, referring to FIG. 1, computing device 1000 may correspond to computing device 128, and one or more components of database 1016 may be implemented on one or more database servers 116.

Data store 1018 may correspond, for example, to database 102 shown in FIG. 1. Similarly, one or more of schema 1020, workload 1022, and query optimizer 1024 may correspond to schema 118, workload 120, and query optimizer 122 shown in FIG. 1 and FIG. 2.

Computer-readable media 1008 can store instructions executable by the processors 1002. Computer-readable media 1008 can also store instructions executable by external processing units such as by an external CPU, an external GPU, and/or executable by an external accelerator, such as an FPGA type accelerator, a DSP type accelerator, or any other internal or external accelerator. In various examples at least one CPU, GPU, and/or accelerator is incorporated in computing device 1000, while in some examples one or more of a CPU, GPU, and/or accelerator is external to computing device 1000.

Computer-readable media may include computer storage media and/or communication media. Computer storage media can include volatile memory, nonvolatile memory, and/or other persistent and/or auxiliary computer storage media, removable and non-removable computer storage media implemented in any method or technology for storage of information such as computer-readable instructions, data structures, program modules, or other data. Computer-readable media 1008 can be an example of computer storage media. Thus, the computer-readable media 1008 includes tangible and/or physical forms of media included in a device and/or hardware component that is part of a device or external to a device, including but not limited to random-access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media embodies computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Computing device 1000 may represent any of a variety of categories or classes of devices, such as client-type devices, server-type devices, desktop computer-type devices, mobile-type devices, special purpose-type devices, embedded-type devices, and/or wearable-type devices. Examples may include, for example, a tablet computer, a mobile phone/tablet hybrid, a personal data assistant, laptop computer, a personal computer, other mobile computers, wearable computers, implanted computing devices, desktop computers, terminals, work stations, or any other sort of computing device configured to implement a partitioning advisor as described herein.

Figure 11:
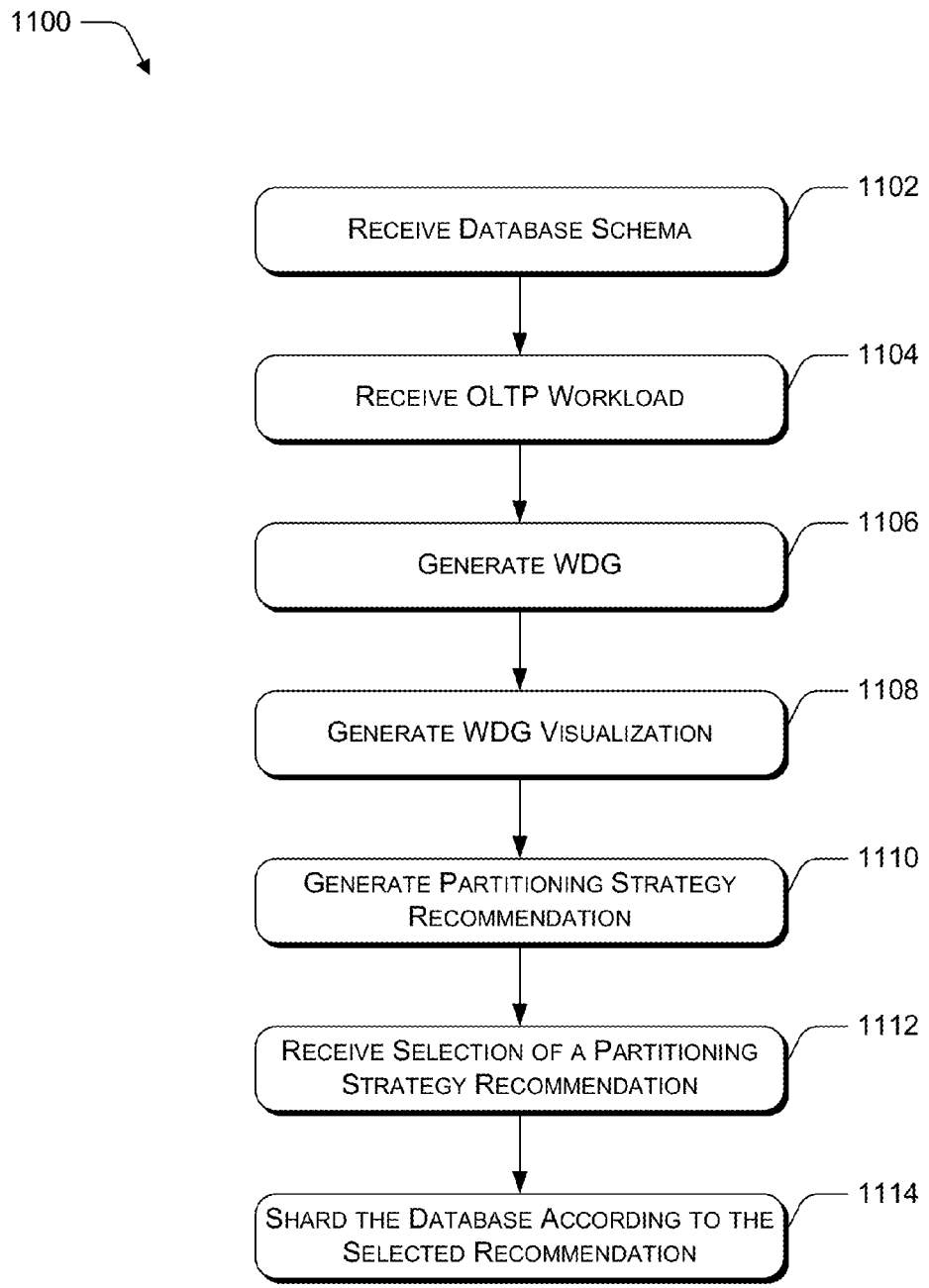
FIG. 11 is a flow diagram of an example method for generating a workload dependency graph visualization and database partitioning recommendations.

FIG. 11 illustrates an example process 1100 for generating a workload dependency graph visualization and database partitioning recommendations using to the partitioning advisor described herein. The process is illustrated as a set of operations shown as discrete blocks. The process may be implemented in any suitable hardware, software, firmware, or combination thereof. The order in which the operations are described is not to be construed as a limitation.

At block 1102, a database schema is received. For example, schema 1020 may be retrieved from a data dictionary associated with database 1016. Alternatively, schema 1020 may be generated based on data store 1018 based on a script generation tool.

At block 1104, an OLTP workload is received. For example, workload 1022 may be received from OLTP application 104 or from an application developer associated with OLTP application 104. Alternatively, workload 1022 may be retrieved from a plan cache or a query store associated with data store 1018. As another alternative, a database tool may generate a trace of database operations over time, which may be used as the workload.

At block 1106, a workload dependency graph is generated. For example, WDG generator 202 generates a workload dependency graph based on the received schema and the received workload. Additional details of an example method for generating a workload dependency graph are described below with reference to FIG. 12.

At block 1108, a WDG visualization is generated. For example, visualization engine 204 renders a visualization of the workload dependency graph generated by the WDG generator 202.

At block 1110, a partitioning strategy recommendation is generated. For example partitioning strategy recommendation engine 206 analyzes the workload dependency graph to identify candidate partitioning strategies, and calculates an estimated cost of each candidate to identify one or more partitioning strategies to recommend. Additional details of an example method for generating a partitioning strategy recommendation are described below with reference to FIG. 13.

At block 1112, a selected partitioning strategy recommendation is received. For example, a database administrator may select a particular partitioning strategy recommendation.

At block 1114, the database is sharded according to the selected partitioning strategy recommendation. For example, the partitioning advisor 126 sends instructions to the database to shard the database across multiple partitions according to the selected partitioning strategy recommendation.

Figure 12:
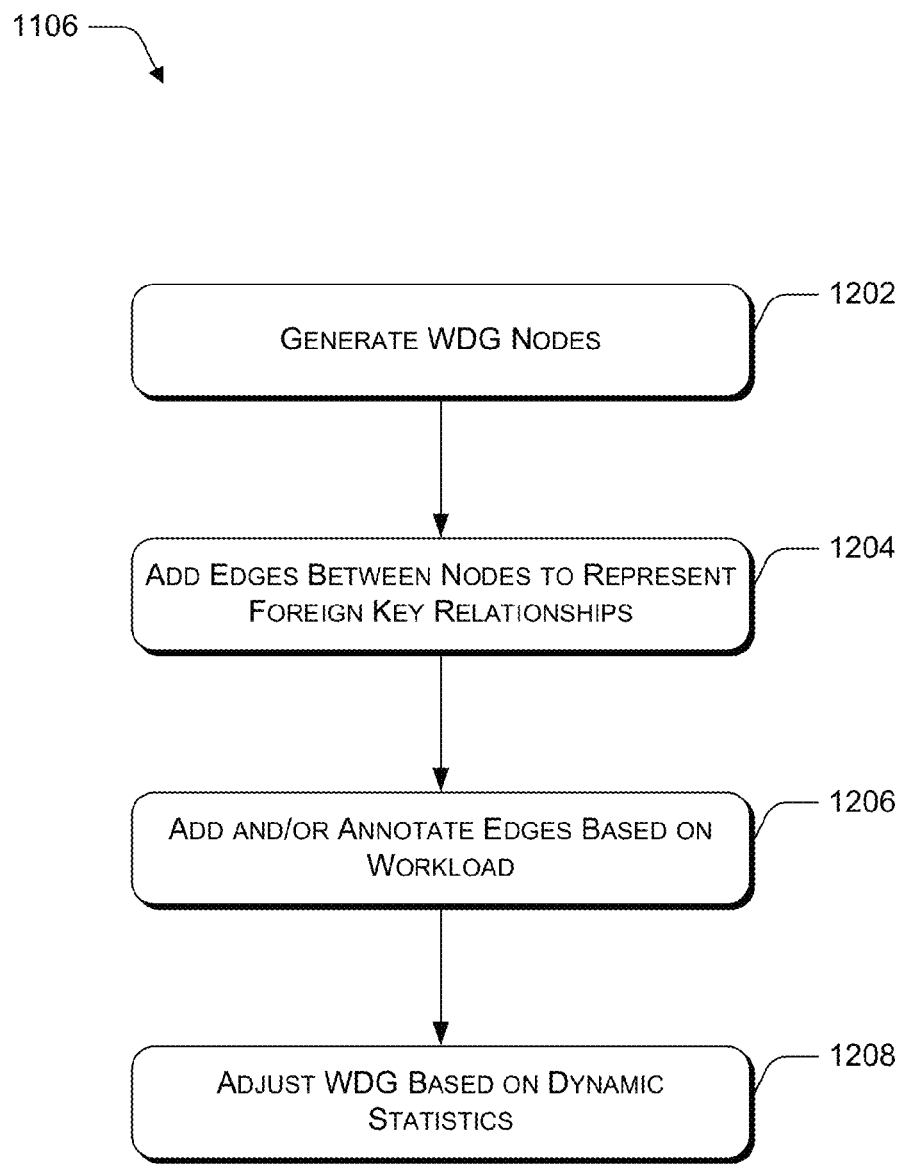
FIG. 12 is a flow diagram of an example method for generating a workload dependency graph.

FIG. 12 illustrates an example process 1106 for generating a workload dependency graph. The process is illustrated as a set of operations shown as discrete blocks. The process may be implemented in any suitable hardware, software, firmware, or combination thereof. The order in which the operations are described is not to be construed as a limitation.

At block 1202, a plurality of workload dependency graph nodes are generated. For example, WDG generator 202 generates a node for each table specified in the schema 1020.

At block 1204, edges are added between the nodes of the WDG to represent foreign key relationships. For example, as described above with reference to FIG. 4, WDG generator 202 adds an edge between each pair of nodes representing tables that have a foreign key relationship. Furthermore, as described above with reference to FIG. 5, each edge may be labeled to indicate the database field over which the two tables are related.

At block 1206, edges are annotated and/or added based on the workload. For example, as described above with reference to FIG. 6, WDG generator 202 analyzes the workload and annotates existing edges and/or adds additional edges (and possibly additional nodes) to indicate relationships between tables that are represented in the workload. For example, as illustrated in FIG. 6, statements found in stored procedures may indicate additional relationships between tables.

At block 1208, the WDG is adjusted based on dynamic statistics. For example, as described above with reference to FIG. 7, nodes may be identified as representing read only tables, nodes may be assigned relative sizes to indicate relative write frequencies, and/or edges may be weighted to indicate a relative impact sharding the database across a particular edge may have.

Figure 13:
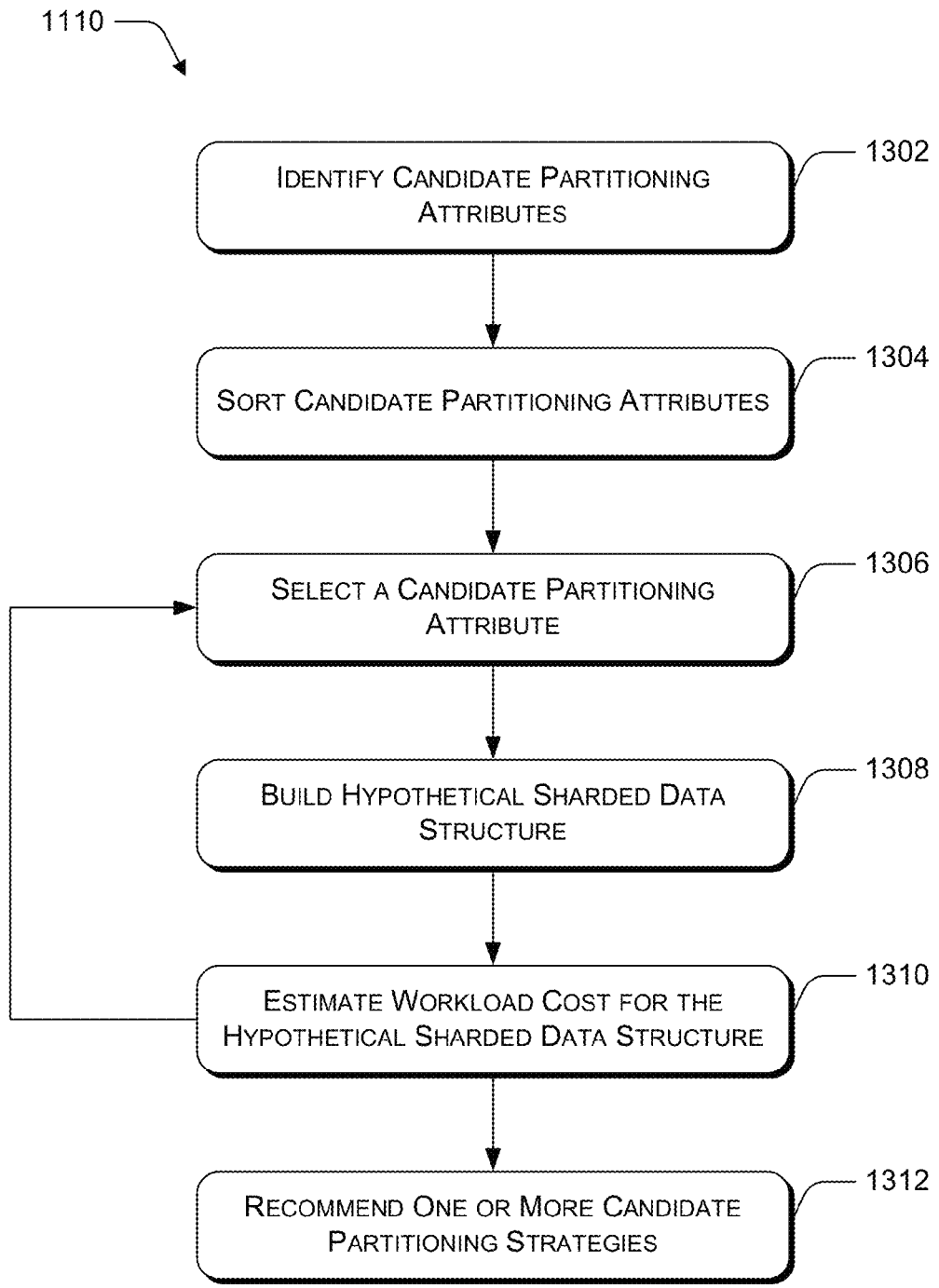
FIG. 13 is a flow diagram of an example method for generating a partitioning strategy recommendation.

FIG. 13 illustrates an example process 1110 for recommending a partitioning strategy. The process is illustrated as a set of operations shown as discrete blocks. The process may be implemented in any suitable hardware, software, firmware, or combination thereof. The order in which the operations are described is not to be construed as a limitation.

At block 1302, a plurality of candidate partitioning attributes are identified. Given a particular database, any table could be sharded based on any column. However, in most cases, some columns are more suitable than others as candidates for sharding. In an example, partitioning strategy recommendation engine 206 analyzes a generated workload dependency graph to identify candidate columns for sharding tables. For example, partitioning strategy recommendation engine 206 identifies each attribute (e.g., column) indicated in the WDG (e.g., as an edge label) as a candidate sharding attribute.

A block 1304, the candidate partitioning attributes are sorted. For example, for each identified candidate sharding attribute, partitioning strategy recommendation engine computes the percentage of all statements or transactions in the workload that are covered by the attribute. The partitioning strategy recommendation engine 206 then sorts the attributes in descending order based on the computed percentages. If multiple attributes have the same percentage of stored procedure statements, other calculations may be used to determine the sort order such as, for example, a percentage of data size of the tables that can be partitioned by the attribute and/or a percentage of insert/update statements against tables that can be partitioned by the attribute.

At block 1306, one of the candidate partitioning attributes is selected. For example, the partitioning strategy recommendation engine selects the first candidate attribute from the sorted list of candidate attributes.

At block 1308, a hypothetical sharded data structure is constructed. For example, partitioning strategy recommendation engine employs an application programming interface (API) exposed by the database to create a hypothetical data structure based on the candidate sharding attribute such that each table that includes or has a foreign key relationship to the candidate sharding attribute is horizontally sharded based on the attribute. Furthermore, in the hypothetical data structure, small read-only or read-mostly tables are replicated and the remaining tables that are not sharded are mapped to a single partition. The API exposed by the database allows for "what-if" scenarios without actually partitioning the database.

At block 1310, a workload cost is estimated for the hypothetical sharded data structure. For example, the partitioning strategy recommendation engine the exposed database API and the query optimizer to estimate a cost of each transaction in the workload. These costs are summed to determine an estimated workload cost for the hypothetical sharded data structure.

As illustrated in FIG. 13, blocks 1306-1310 may be repeated any number of times, for example, for each candidate partitioning attribute in the sorted list. Alternatively, only a portion of the candidate partitioning attributes in the sorted list may used to perform processing described with reference to blocks 1308 and 1310. For example, the top N candidate partitioning attributes or the top M % of the candidate partitioning attributes may be analyzed. Alternatively, each candidate partitioning attribute in the sorted list may be analyzed until an estimate workload cost of the current candidate partitioning attribute differs from the estimate workload cost of the first candidate partitioning attribute in the list by a threshold amount.

At block 1312, one or more candidate partitioning strategies are recommended. For example, partitioning strategy recommendation engine may present one or more of the candidate partitioning attributes as a recommendation for sharding the database. In an example, the recommended candidate partitioning strategies correspond to the candidate partitioning attributes that resulted in the lowest estimated workload costs. The recommendation may include an estimated workload cost associated with each candidate partitioning attribute. A user (e.g., database administrator) may then compare the respective estimated workload costs in selecting a recommendation to implement.

EXAMPLE CLAUSES

A: A method comprising: identifying a schema defining a relational database; identifying a workload based on an online transaction processing (OLTP) application that accesses the relational database, the workload comprising a plurality of transactions to be executed against the relational database; based on the schema and the workload, generating a workload dependency graph (WDG), wherein: a first node of the WDG represents a first table in the relational database; a second node of the WDG represents a second table in the relational database; and an edge between the first node and the second node represents a dependency between a column in the first table and a column in the second table; and recommending a partitioning strategy to shard the relational database based at least in part on the WDG.

B: A method as Paragraph A recites, wherein the dependency between the column in the first table and the column in the second table is a foreign key relationship.

C: A method as Paragraph A or Paragraph B recites, wherein the dependency between the column in the first table and the column in the second table is based on a transaction of the workload.

D: A method as any of Paragraphs A-C recite, wherein generating the workload dependency graph comprises indicating a node of the workload dependency graph that represents a read-only table.

E: A method as any of Paragraphs A-D recite, wherein relative sizes of the first node and the second node reflect relative weights of the first table and the second table with regard to partitioning the relational database.

F: A method as Paragraph E recites, wherein the relative weights of the first table and the second table reflect relative write frequencies of transactions of the workload against the first table and the second table.

G: A method as any of Paragraphs A-F recite, wherein relative widths of edges between nodes of the WDG reflect relative weights of the edges with regard to partitioning the relational database.

H: A method as Paragraph G recites, wherein the relative weights of the edges reflect estimated relative costs of sharding the database based on the edges.

I: A method as any of Paragraphs A-H recite, wherein recommending a partitioning strategy comprises: identifying a plurality of candidate partitioning attributes; for each candidate partitioning attribute: generating a hypothetical sharded data structure based on the candidate partitioning attribute; and estimating a workload cost for the hypothetical sharded data structure; and recommending a partitioning strategy based on a candidate partitioning attribute having a lowest estimated workload cost.

J: A method a Paragraph I recites, wherein recommending a partitioning strategy based on a candidate partitioning attribute having a lowest estimated workload cost includes recommending a plurality of partitioning strategies having estimated workload costs that are lower than one estimated workload costs of partitioning strategies that are not recommended.

K: A method as Paragraph I or Paragraph J recites, wherein estimating a workload cost for the hypothetical sharded data structure comprises: for each transaction in the workload, using a query optimizer to estimate a cost of executing the transaction against the hypothetical sharded data structure; and estimating the workload cost for the hypothetical sharded data structure as a sum of the estimated cost of executing each transaction against the hypothetical sharded data structure.

L: A method as any of Paragraphs A-H recite, wherein recommending a partitioning strategy comprises: identifying a plurality of candidate sharding attributes based on the WDG; for individual candidate sharding attributes of the plurality of candidate sharding attributes, estimating a workload cost; and recommending a partitioning strategy based on a candidate sharding attribute having a lowest estimated workload cost.

M: A method as any of Paragraphs A-L recite, further comprising presenting a visualization of the WDG.

N: One or more computer-readable media comprising computer-executable instructions for performing the method as recited in any of Paragraphs A-M.

O: A device comprising: a computer-readable media; one or more processing units coupled to the computer-readable media; and a partitioning advisor stored in the computer-readable media and executable by the one or more processing units, the partitioning advisor configured to generate a partitioning strategy recommendation for sharding a relational database based, at least in part, on a schema of the relational database and a workload associated with an online transaction processing application.

P: A device as Paragraph O recites, wherein the partitioning advisor comprises a workload dependency graph generator configured to generate a workload dependency graph based on the schema and the workload.

Q: A device as Paragraph O or Paragraph P recites, wherein the workload dependency graph comprises: a plurality of nodes, wherein each node represents a table of the relational database; and an edge between a first node of the plurality of nodes and a second node of the plurality of nodes, the edge representing a workload dependency between a column in a table represented by the first node and a column in a table represented by the second node.

R: A device as Paragraph P or Paragraph Q recites, wherein the partitioning advisor further comprises a visualization engine configured to render a visualization of the workload dependency graph.

S: A device as any of Paragraphs P-R recite, wherein the partitioning advisor further comprises a partitioning strategy recommendation engine configured to generate a partitioning strategy recommendation for sharding the relational database based, at least in part, on the workload dependency graph.

T: A system comprising: a relational database comprising: a plurality of tables, each table having one or more columns; and a schema that defines a structure of the relational database; an online transaction processing application having a workload that defines transactions that are performed against the relational database; and a partitioning advisor configured to recommend a partitioning strategy for sharding one or more tables of the relational database.

U: A system as Paragraph T recites, wherein the partitioning advisor comprises a workload dependency graph generator configured to generate a workload dependency graph based on the schema and the workload.

V: A system as Paragraph U recites, wherein the partitioning advisor comprises a workload dependency graph generator configured to generate a workload dependency graph based on the schema and the workload.

W: A system as Paragraph U or Paragraph V recites, wherein the partitioning advisor further comprises a partitioning strategy recommendation engine configured to analyze the workload dependency graph to: identify a candidate sharding attribute; and estimate a workload cost associated with the candidate sharding attribute.

CONCLUSION

Although the techniques have been described in language specific to structural features and/or methodological acts, it is to be understood that the appended claims are not necessarily limited to the features or acts described. Rather, the features and acts are described as example implementations of such techniques.

The operations of the example processes are illustrated in individual blocks and summarized with reference to those blocks. The processes are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) 106, 120, and/or 200 such as one or more internal or external CPUs or GPUs, and/or one or more pieces of hardware logic such as FPGAs, DSPs, or other types of accelerators.

All of the methods and processes described above may be embodied in, and fully automated via, software code modules executed by one or more general purpose computers or processors. The code modules may be stored in any type of computer-readable storage medium or other computer storage device. Some or all of the methods may alternatively be embodied in specialized computer hardware.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art. It should be emphasized that many variations and modifications may be made to the above-described examples, the elements of which are to be understood as being among other acceptable examples. All such modifications and variations are intended to be included herein within the scope of this disclosure and protected by the following claims.

What is claimed is:

1. A method comprising:
   identifying a schema defining a relational database;
   identifying a workload based on an online transaction processing (OLTP) application that accesses the relational database, the workload comprising a plurality of transactions to be executed against the relational database;
   based on the schema and the workload, generating a workload dependency graph (WDG), wherein:
   a first node of the WDG represents a first table in the relational database;
   a second node of the WDG represents a second table in the relational database; and
   an edge between the first node and the second node represents a dependency between a column in the first table and a column in the second table; and
   recommending at least one partitioning strategy to shard the relational database based at least in part on the WDG,
   wherein relative sizes of the first node and the second node reflect relative weights of the first table and the second table with regard to partitioning the relational database; and
   sharding the database across the first and second tables in accordance with one of said at least one recommended partitioning strategies.

2. A method as recited in claim 1, wherein the dependency between the column in the first table and the column in the second table is a foreign key relationship.

3. A method as recited in claim 1, wherein the dependency between the column in the first table and the column in the second table is based on a transaction of the workload.

4. A method as recited in claim 1, wherein the relative weights of the first table and the second table reflect relative write frequencies of transactions of the workload against the first table and the second table.

5. A method as recited in claim 1, wherein relative widths of edges between nodes of the WDG reflect relative weights of the edges with regard to partitioning the relational database.

6. A method as recited in claim 5, wherein the relative weights of the edges reflect estimated relative costs of sharding the database based on the edges.

7. A method as recited in claim 1, wherein recommending a partitioning strategy comprises:
   identifying a plurality of candidate partitioning attributes;
   for each candidate partitioning attribute:
   generating a hypothetical sharded data structure based on the candidate partitioning attribute; and
   estimating a workload cost for the hypothetical sharded data structure; and
   recommending a partitioning strategy based on a candidate partitioning attribute having a lowest estimated workload cost.

8. A method as recited in claim 7, wherein estimating a workload cost for the hypothetical sharded data structure comprises:
   for each transaction in the workload, using a query optimizer to estimate a cost of executing the transaction against the hypothetical sharded data structure; and
   estimating the workload cost for the hypothetical sharded data structure as a sum of the estimated cost of executing each transaction against the hypothetical sharded data structure.

9. A method as recited in claim 1, further comprising presenting a visualization of the WDG.

10. A method as recited in claim 1, wherein recommending a partitioning strategy comprises:
    identifying a plurality of candidate sharding attributes based on the WDG;
    for individual candidate sharding attributes of the plurality of candidate sharding attributes, estimating a workload cost; and
    recommending a partitioning strategy based on a candidate sharding attribute having a lowest estimated workload cost.

11. A device comprising:
    a computer-readable media;
    one or more processing units coupled to the computer-readable media;

a relational database comprising a plurality of tables, the relational database sharding across the plurality of tables in response to a partitioning instruction; and a partitioning advisor stored in the computer-readable media and executable by the one or more processing units, the partitioning advisor configured to generate the partitioning instruction from a selected one of at least one partitioning strategy recommendation for sharding the relational database based, at least in part, on a schema of the relational database and a workload associated with an online transaction processing application, wherein the partitioning advisor comprises:

a workload dependency graph generator configured to generate a workload dependency graph based on the schema and the workload, the workload dependency graph comprising a plurality of nodes, wherein each node represents a table of the relational database, and an edge between a first node of the plurality of nodes and a second node of the plurality of nodes, the edge representing a workload dependency between a column in a table represented by the first node and a column in a table represented by the second node, wherein relative sizes of the first node and the second node reflect relative weights of the table represented by the first node and the table represented by the second node with regard to partitioning the relational database.

12. A device as recited in claim 11, wherein the partitioning advisor further comprises a visualization engine configured to render a visualization of the workload dependency graph.

13. A device as recited in claim 11, wherein the partitioning advisor further comprises a partitioning strategy recommendation engine configured to generate a partitioning strategy recommendation for sharding the relational database based, at least in part, on the workload dependency graph.

14. A system comprising: a relational database comprising:

a plurality of tables, each table having one or more columns that are sharded in response to a partitioning instruction; and a schema that defines a structure of the relational database;

an online transaction processing application having a workload that defines transactions that are performed against the relational database;

one or more processing units; and a partitioning advisor executable by the one or more processing units and configured to generate the partitioning instruction from a selected one of at least one partitioning strategy recommendation for sharding one or more tables of the relational database based, at least in part, on the schema and the workload associated with the online transaction processing application, wherein the partitioning advisor comprises:

a workload dependency graph generator configured to generate a workload dependency graph based on the schema and the workload, the workload dependency graph comprising a plurality of nodes, wherein each node represents a table of the relational database, and an edge between a first node of the plurality of nodes and a second node of the plurality of nodes, the edge representing a workload dependency between a column in a table represented by the first node and a column in a table represented by the second node, wherein relative sizes of the first node and the second node reflect relative weights of the table represented by the first node and the table represented by the second node with regard to partitioning the relational database.

15. A system as recited in claim 14, wherein the partitioning advisor further comprises a visualization engine configured to render a visualization of the workload dependency graph.

16. A system as recited in claim 14, wherein the partitioning advisor further comprises a partitioning strategy recommendation engine configured to analyze the workload dependency graph to:

identify a candidate sharding attribute; and estimate a workload cost associated with the candidate sharding attribute.

* * * * *